United States Patent
dos Santos Fegadolli (10) Patent No.: US 11,506,838 B2
(45) Date of Patent: Nov. 22, 2022

(54) PHOTONIC INTEGRATED CIRCUIT FOR A PLURALITY OF OPTICAL TRANSMITTERS AND RECEIVERS

(71) Applicant: Nokia Solutions and Networks OY, Espoo (FI)

(72) Inventor: William dos Santos Fegadolli, Azusa, CA (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 16/855,455

(22) Filed: Apr. 22, 2020

(65) Prior Publication Data
US 2021/0333472 A1    Oct. 28, 2021

(51) Int. Cl.
G02B 6/122    (2006.01)
G02B 6/26    (2006.01)
G02B 6/36    (2006.01)

(52) U.S. Cl.
CPC ............. *G02B 6/1225* (2013.01); *G02B 6/26* (2013.01); *G02B 6/3636* (2013.01)

(58) Field of Classification Search
CPC ............... G02B 6/12; G02B 6/26; G02B 6/36
See application file for complete search history.

(56) References Cited

U.S. PATENT DOCUMENTS

| | | | |
|---|---|---|---|
| 6,181,864 B1 | 1/2001 | Jang et al. | |
| 6,377,732 B1 | 4/2002 | Li et al. | |
| 7,542,636 B2 | 6/2009 | Blauvelt et al. | |
| 8,483,528 B2 | 7/2013 | Socci et al. | |
| 8,750,654 B2 | 6/2014 | Dupuis et al. | |
| 9,927,575 B2 | 3/2018 | Goodwill et al. | |
| 10,025,043 B2 | 7/2018 | Vallance et al. | |
| 10,345,522 B2 | 7/2019 | Daniel | |

(Continued)

OTHER PUBLICATIONS

Klinger, S., et al. "Ge-on-Si pin photodiodes with a 3-dB bandwidth of 49 GHz." IEEE Photonics Technology Letters 21.13 (2009): 920-922.

(Continued)

*Primary Examiner* — Tina M Wong
(74) *Attorney, Agent, or Firm* — Mendelsohn Dunleavy, P.C.; Steve Mendelsohn; Yuri Gruzdkov (57) ABSTRACT

A photonic integrated circuit (PIC) having a substrate in which vertically coupled photodetectors and in-line optical modulators are integrated to enable vertical coupling of light using a fiber assembly block (FAB), with the planar end surface thereof being attached to a substantially planar main surface of the substrate. In an example embodiment, the photodetectors are buried in deep vias formed in the substrate, and the in-line optical modulators are waveguide-connected to the corresponding vertical-coupling optical gratings. The photodetectors and optical gratings may be arranged in a linear array along the main surface of the substrate to enable uncomplicated optical alignment of end segments of the optical fibers in the FAB with the corresponding photodetectors and optical gratings for vertical coupling of light therebetween. In some embodiments, the FAB may have more than one hundred optical fibers. In some embodiments, the PIC can be implemented using the silicon photonics material platform.

18 Claims, 7 Drawing Sheets

(56) References Cited

U.S. PATENT DOCUMENTS

| | | |
|---|---|---|
| 2004/0037519 A1 | 2/2004 | Kilian |
| 2005/0013558 A1 | 1/2005 | Powers |
| 2005/0053319 A1 | 3/2005 | Doan |
| 2007/0132064 A1 | 6/2007 | Mei et al. |
| 2007/0237444 A1 | 10/2007 | Keil |
| 2008/0240645 A1* | 10/2008 | Funabashi .......... G02B 6/12004 385/14 |
| 2014/0270784 A1 | 9/2014 | Thacker et al. |
| 2015/0037044 A1 | 2/2015 | Peterson et al. |
| 2015/0125110 A1 | 5/2015 | Anderson et al. |
| 2015/0293305 A1 | 10/2015 | Nakagawa et al. |
| 2017/0123170 A1* | 5/2017 | Furuya .................. G02B 6/3652 |
| 2017/0168235 A1* | 6/2017 | Zhang .................. G02B 6/4257 |
| 2017/0227723 A1* | 8/2017 | Murakami ........... G02B 6/4243 |
| 2018/0196196 A1 | 7/2018 | Byrd et al. |
| 2018/0329159 A1 | 11/2018 | Mathai et al. |
| 2019/0107673 A1* | 4/2019 | Verslegers ............. G02B 6/126 |
| 2019/0243164 A1 | 8/2019 | Nelson et al. |
| 2019/0258175 A1 | 8/2019 | Dietrich et al. |
| 2020/0409001 A1* | 12/2020 | Liang .................... H01L 31/107 |
| 2021/0333472 A1* | 10/2021 | dos Santos Fegadolli ................. G02B 6/4214 |

OTHER PUBLICATIONS

Wang, Jian, et al. "Ge-photodetectors for Si-based optoelectronic integration." Sensors 11.1 (2011): 696-718.

Sood, Ashok K., et al. "SiGe Based Visible-NIR Photodetector Technology for Optoelectronic Applications." Chapter 10 of Advances in Optical Fiber Technology: Fundamental Optical Phenomena and Applications (2015): 315-361.

Feng, Dazeng, et al. "High-speed Ge photodetector monolithically integrated with large cross-section silicon-on-insulator waveguide." Applied Physics Letters 95.26 (2009): 261105-1-261105-3.

Inside the Silicon Photonics Transceiver, www.melanox.com, 2020 [retrieved on Mar. 10, 2020] Retrieved from the Internet: <URL: https://community.mellanox.com/s/article/inside-the-silicon-photonics-transceiver> (5 pages).

Technology—Luxtera, www.luxtera.com, 2020 [retrieved on Mar. 10, 2020] Retrieved from the Internet: <URL: http://www.luxtera.com/silicon-photonics-technology/> (5 pages).

U.S. Appl. No. 16/595,698, "Electro-Optical Apparatus Having High-Throughput Electrical Data Links" filed Oct. 8, 2019; (36 pages).

U.S. Appl. No. 16/855,618 "Optical-to-Electric-to-Optical Routing Engine Background" filed Apr. 22, 2020; (18 pages).

Sparacin, D.—"Silicon Photonics", www.juniper.net, 2019 [retrieved on Feb. 14, 2020] Retrieved from the Internet: <URL: https://www.juniper.net/assets/us/en/local/pdf/nxtwork/silicon-photonics.pdf> (21 pages).

Feldman, Michael—"On-Chip Optical Links Are One Step Closer to Reality" www.nextplatform.com, 2019 [retrieved on Feb. 13, 2020] Retrieved from the Internet: <URL: https://www.nextplatform.com/2019/09/11/on-chip-optical-links-are-one-step-closer-to-reality/> (10 pages).

Photonics for Datacenters: Integrated optics permeate datacenter networks, www.laserworldfocus.com, 2018 [retrieved on Feb. 13, 2020] Retrieved from the Internet: <URL: https://www.laserfocusworld.com/optics/article/16555340/photonics-for-datacenters-integrated-optics-permeate-datacenter-networks> (17 pages).

Infinera Unveils Multi-Terabit Optical Transport, www.broadbandtechreport.com 2011 [retrieved on Feb. 14, 2020] Retrieved from the Internet: <URL: https://www.broadbandtechreport.com/home/article/16441542/infinera-unveils-multiterabit-optical-transport> (11 pages).

De Dobbelaere, Peter. "Silicon Photonics Technology Platform for Integration of Optical IOs with ASICs." 2013 IEEE Hot Chips 25 Symposium (HCS). IEEE, 2013: (18 pages).

Chen, Xia, et al. "The Emergence of Silicon Photonics as a Flexible Technology Platform." Proceedings of the IEEE 106.12 (2018): 2101-2116.

Chen, Long, et al. "Low-Loss and Broadband Cantilever Couplers Between Standard Cleaved Fibers and High-Index-Contrast Si3N4 or Si Waveguides." IEEE Photonics Technology Letters 22.23 (2010): 1744-1746.

Cheben, Pavel, et al. "Broadband polarization independent nanophotonic coupler for silicon waveguides with ultra-high efficiency." Optics Express 23.17 (2015): 22553-22563.

Fadel, Maxim, et al. "Low-Loss and Low-Birefringence High-Contrast Silicon-Oxynitride Waveguides for Optical Communication." Journal of Lightwave Technology 27.6 (2009): 698-705.

* cited by examiner

PHOTONIC INTEGRATED CIRCUIT FOR A PLURALITY OF OPTICAL TRANSMITTERS AND RECEIVERS

BACKGROUND

Field

Various example embodiments relate to optical communication equipment and, more specifically but not exclusively, to optical transmitters and receivers.

Description of the Related Art

This section introduces aspects that may help facilitate a better understanding of the disclosure. Accordingly, the statements of this section are to be read in this light and are not to be understood as admissions about what is in the prior art or what is not in the prior art.

The demand for higher data rates and lower latency drives the application of new technologies in communications. For example, optical communication technologies can be used to support the current and future data-rate and latency needs. The corresponding circuits may employ electrical and/or optical components configured to exchange relatively large volumes of data at a relatively high rate. However, solutions that are based on scaling up conventional electrical-to-optical (E/O) and/or optical-to-electrical (O/E) front-end circuits may encounter significant problems, such as challenging thermal-management issues, packaging constrains, manufacturability, reliability, and/or tougher power-efficiency restrictions.

SUMMARY OF SOME SPECIFIC EMBODIMENTS

Disclosed herein are various embodiments of a photonic integrated circuit (PIC) having a substrate in which vertically coupled photodetectors and in-line optical modulators are integrated to enable vertical coupling of light using a fiber assembly block (FAB), with a planar end surface thereof being attached to a substantially planar main surface of the substrate. In an example embodiment, the photodetectors are buried in deep vias formed in the substrate, and the in-line optical modulators are waveguide-connected in the substrate to the corresponding vertical-coupling optical gratings. The photodetectors and optical gratings may be arranged in a linear array along the main surface of the substrate to enable uncomplicated optical alignment of end segments of the optical fibers in the FAB with the corresponding photodetectors and optical gratings for vertical coupling of light therebetween. In some embodiments, the FAB may have more than one hundred optical fibers. In some embodiments, the PIC can be implemented using the silicon photonics material platform.

According to an example embodiment, provided is an apparatus comprising: a substrate having a substantially planar main surface; a plurality of photodiodes integrated in the substrate to enable vertical coupling of input light thereto through said main surface; and a plurality of in-line optical modulators integrated in the substrate and waveguide-connected in the substrate to a plurality of first vertical-coupling elements to enable vertical coupling of output light therefrom through said main surface.

BRIEF DESCRIPTION OF THE DRAWINGS

Other aspects, features, and benefits of various disclosed embodiments will become more fully apparent, by way of example, from the following detailed description and the accompanying drawings, in which.

DETAILED DESCRIPTION

Some embodiments may benefit from the use of at least some features described in U.S. patent application Ser. No. 16/855,618, which is incorporated herein by reference in its entirety.

Some embodiments may benefit from the use of at least some features described in U.S. patent application Ser. No. 16/595,698, which is incorporated herein by reference in its entirety.

Figure 1:
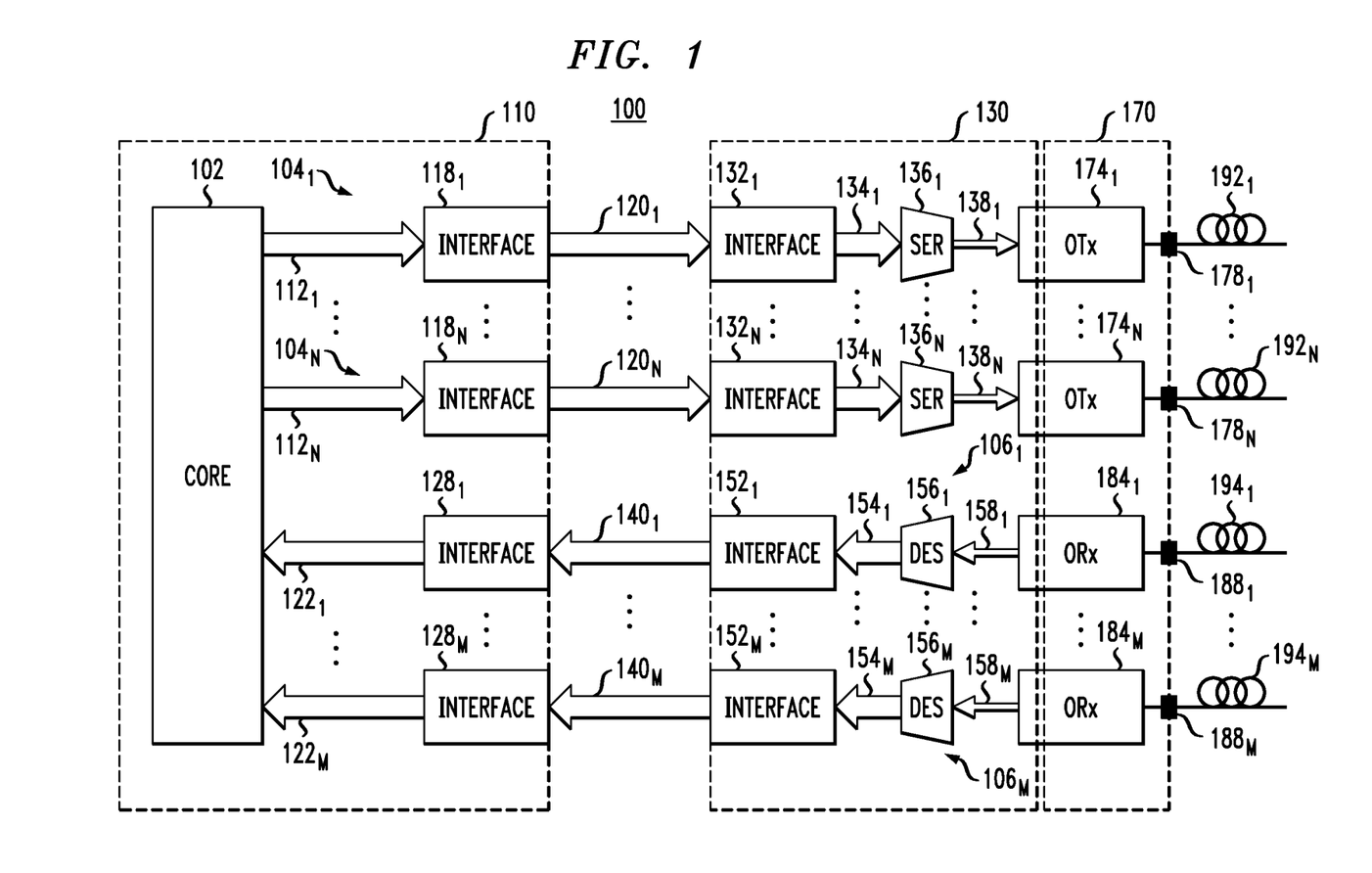
FIG. 1 shows a block diagram of an optical communication system according to an embodiment.

FIG. 1 shows a block diagram of an optical communication system (e.g., an optical network node) 100 according to an embodiment. As shown, system 100 comprises optical transmitters (OTx's) $174_1$-$174_N$ and optical receivers (ORx's) $184_1$-$184_M$, where N is an integer greater than one, and M is an integer greater than one. Optical fibers $192_1$-$192_N$ are end-connected to optical output ports $178_1$-$178_N$, respectively, to transmit modulated light generated by optical transmitters $174_1$-$174_N$ to respective remote optical receivers (not explicitly shown in FIG. 1). Optical fibers $194_1$-$194_M$ are similarly end-connected to optical input ports $188_1$-$188_M$ to feed the received modulated light to optical receivers $184_1$-$184_M$, respectively. The received modulated light may be generated by remote optical transmitters (not explicitly shown in FIG. 1) connected to the far ends of the optical fibers $194_1$-$194_M$.

Figure 2:
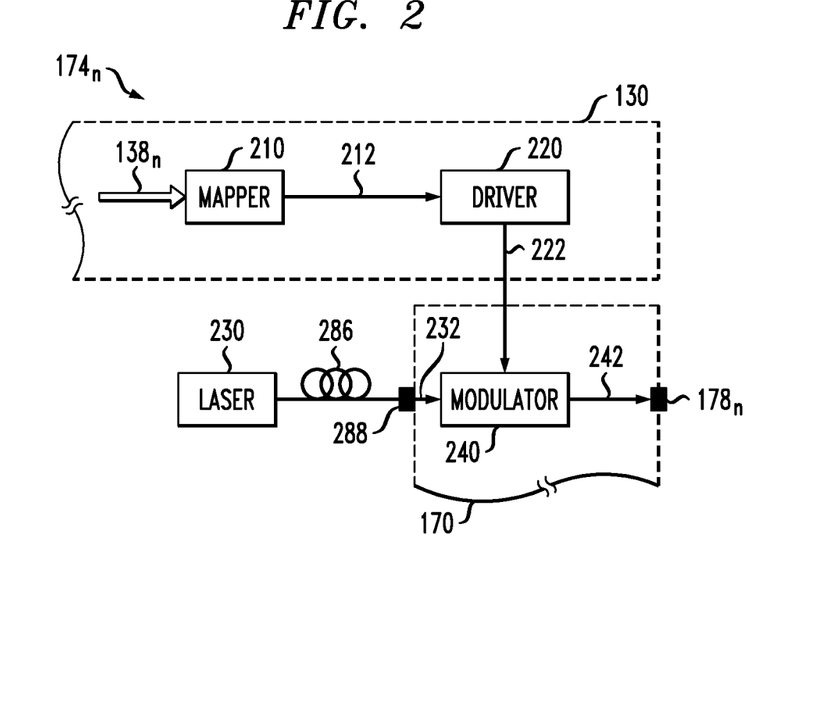
FIG. 2 shows a block diagram of an optical transmitter that can be used in the optical communication system of FIG. 1 according to an embodiment.

In some embodiments, optical transmitters $174_1$-$174_N$ may receive respective optical carriers, for modulation therein, from one or more external light sources (e.g., lasers; not explicitly shown in FIG. 1; e.g., see FIG. 2). In such embodiments, optical transmitters $174_1$-$174_N$ may be connected to an additional set of optical input ports (not explicitly shown in FIG. 1) that may feed the received optical carrier(s) to the optical modulators used in the optical transmitters (also see FIGS. 2, 4) via additional optical fibers (not explicitly shown in FIG. 1).

In some embodiments, the number N of optical transmitters 174 may be different from the number M of optical receivers 184. In some other embodiments, N=M.

In some embodiments, the number N can be N=1.

In some embodiments, the number M can be M=1.

System 100 further comprises a core electrical circuit (e.g., an ASIC) 102 that is electrically linked to optical transmitters 174 and optical receivers 184 as explained in more detail below. As a result, circuit 102 can transmit data signals by way of optical transmitters 174 and can receive data signals by way of optical receivers 184.

The function of the core electrical circuit 102 may depend on the specific embodiment. For example, in some embodiments, system 100 can be an NxM optical-electrical-optical (OEO) switch configured to perform signal switching in the electrical domain using a corresponding N×M electrical switch implemented by the core electrical circuit 102.

In some other example embodiments, system 100 can be a multichannel OEO 3R converter. Herein, 3R stands for re-timing, re-shaping, and re-amplifying data signals. This type of system 100 can be used, e.g., for changing the assignment of carrier wavelengths of some data signals transmitted therethrough. In such embodiments, the core electrical circuit 102 is designed to support the indicated conversion.

In other example embodiments, the system architecture indicated in FIG. 1 can be used to implement a server, a router, or a next-generation backplane.

In an example embodiment, system 100 comprises N transmit-channel circuits $104_1$-$104_N$ associated with the optical transmitters (OTx's) $174_1$-$174_N$, respectively, and M receive-channel circuits $106_1$-$106_M$ associated with the optical receivers (ORx's) $184_1$-$184_M$, respectively. In some embodiments, the N transmit channels may be implemented using N nominally identical circuits, e.g., different respective instances (nominal copies) of the same transmit-channel circuit. Similarly, the M receive channels may be implemented using M nominally identical circuits, e.g., different respective instances of the same receive-channel circuit.

In an example embodiment, a transmit-channel circuit $104_n$ (where n=1, . . . , N) comprises a first interface circuit $118_n$, a second interface circuit $132_n$, and a serializer $136_n$ that are serially connected in the transmit chain between the core electrical circuit 102 and optical transmitter $174_n$ using electrical buses $112_n$, $120_n$, $134_n$, and $138_n$. Each of electrical buses $112_n$, $120_n$, and $134_n$ is a q-bit bus, e.g., implemented using q parallel electrical lines, where q is an integer greater than one. Electrical bus $138_n$ is an r-bit bus, where r is an integer constrained by the inequality $1 < r < q$.

In an example embodiment, the following values of q and r may be used: q=128; r=2.

In some embodiments, r=1. In such embodiments, electrical bus $138_n$ is replaced by a corresponding single electrical line.

In some embodiments, electrical bus $120_n$ may have a different number of parallel electrical lines than electrical buses $112_n$, $116_n$, and $134_n$. For example, the number of parallel electrical lines in electrical bus $120_n$ may be greater or smaller than the number q.

In an example embodiment, optical transmitter $174_n$ may be configured to generate the corresponding optical output signal using an optical PAM-$2^r$ constellation such that, in each modulation time slot, the transmitted PAM-$2^r$ optical symbol carries the corresponding r bits applied to the optical transmitter by electrical bus $138_n$. Herein, PAM stands for pulse-amplitude modulation. A person of ordinary skill in the art will understand that other suitable optical constellations may alternatively be selected based on the number r.

In some embodiments, the total data rate at which electrical bus $112_n$ transmits data may be higher than, e.g., 1000 Mbps. In various embodiments, any suitable electrical modulation format can be used. Examples of such formats include but are not limited to binary non-return-to-zero (NRZ), binary return-to-zero (RZ), PAM, etc.

Electrical bus $120_n$ is typically of a greater physical length than the other electrical buses of transmit-channel circuit $104_n$. Interface circuits $118_n$ and $132_n$ may perform signal transformation and/or coding/decoding directed at making the electrical signals transmitted on electrical bus $120_n$ more resilient to the relatively strong signal distortions and loss that are typically caused by the transmission through a relatively long parallel electrical bus.

For example, each of the electrical data signals transmitted on electrical bus $112_n$ may be a sequence of binary NRZ waveforms in which one constant voltage level represents a binary "1" and the other constant voltage level represents a binary "0." In such an electrical data signal, a repeating "01" bit sequence may be represented by a sequence of substantially rectangular pulses, the rising and falling edges of which cause said electrical data signal to have relatively strongly pronounced high-frequency components that would be susceptible to strong distortions and loss in electrical bus $120_n$. However, interface circuit $118_n$ may be configured to transform a sequence of binary NRZ waveforms into a sequence of other waveforms that are shaped such as to significantly reduce the rate(s) of distortions and loss to which the resulting electrical signal is subjected in electrical bus $120_n$. Interface circuit $132_n$ can then be used to substantially recover the initial binary NRZ waveforms based on said other waveforms received via electrical bus $120_n$ from interface circuit $118_n$. The recovered binary NRZ waveforms are then transmitted further downstream on electrical bus $134_n$. Herein, NRZ stands for non-return-to-zero.

The number of parallel electrical lines and per-line bit rate for electrical bus $120_n$ may be selected such as to keep the amounts of signal processing in interface circuits $118_n$ and $132_n$ relatively small but sufficient for preserving the integrity of the electrical data signals transmitted through this electrical bus.

In an example embodiment, serializer $136_n$ operates to compress the q bit streams applied thereto by electrical bus $134_n$ into r bit streams, which are then transmitted downstream by way of electrical bus $138_n$. Due to this compression, the resulting electrical data signals transmitted on electrical bus $138_n$ are switched at a higher frequency rate than the corresponding electrical data signals transmitted on electrical bus $134_n$. As already indicated above, in some embodiments, the number r may be r=1. In such embodiments, serializer $136_n$ operates to compress the q received bit streams into a corresponding single bit stream.

In an example embodiment, a receive-channel circuit $106_m$ (where m=1, . . . , M) comprises a deserializer (DES) $156_m$, a first interface circuit $152_m$, and a second interface circuit $128_m$ that are serially connected in an electrical receive chain between the optical receiver $184_m$ and core electrical circuit 102 using electrical buses $122_m$, $140_m$, $154_m$, and $158_m$. Each of electrical buses $122_m$, $140_m$, and $154_m$ is a t-bit bus, where t is an integer greater than one. Electrical bus $158_m$ is a u-bit bus, where u is an integer constrained by the inequality $1 < u < t$.

In an example embodiment, the following values of t and u may be used: t=128; u=2.

In some embodiments, u=1. In such embodiments, electrical bus $158_m$ is replaced by a corresponding single electrical line.

In some embodiments, electrical bus $140_m$ may have a different number of parallel electrical lines than either of electrical buses $122_m$ and $154_m$. For example, the number of parallel electrical lines in electrical bus $140_m$ may be greater or smaller than the number t.

In an example embodiment, optical receiver $184_m$ may be configured to detect a received optical input signal that has been generated by the corresponding remote optical transmitter using a PAM-$2^u$ constellation such that, in each modulation time slot, the transmitted PAM-$2^u$ optical symbol carries the corresponding u bits. A person of ordinary skill in the art will understand that the use of other optical constellations is also possible, with the constellation selection being made, e.g., based on the number u.

In an example embodiment, deserializer $156_m$ operates to decompress the u bit streams applied thereto by electrical bus (or single line) $158_m$ into t bit streams, which are then transmitted upstream by way of electrical bus $154_m$. Due to this decompression, the resulting electrical data signals transmitted on electrical bus $154_m$ are switched at a lower frequency rate than the corresponding electrical data signals transmitted on electrical bus (or single line) $158_m$.

The physical length of electrical bus $140_m$ may be similar to that of electrical bus $120_n$. The physical length of electrical bus $140_m$ is also typically greater than the physical lengths of the other electrical buses of receive-channel circuit $106_m$ (also see FIG. 2). Interface circuits $152_m$ and $128_m$ perform signal transformation and/or coding/decoding directed at making the electrical signals transmitted on electrical bus $140_m$ more resilient to the relatively strong signal distortions and loss that are typically caused by the transmission through a relatively long electrical bus. In an example embodiment, interface circuit $152_m$ may be analogous to interface circuit $118_n$, and interface circuit $128_m$ may be analogous to interface circuit $132_n$.

In various embodiments, any suitable electrical modulation format can be used for data transmission on electrical bus $122_m$. Examples of such formats include but are not limited to NRZ, RZ, and PAM.

The dashed lines in FIG. 1 indicate an example packaging solution that can be used to implement system 100 according to an embodiment. As shown, system 100 comprises three separate integrated circuits (e.g., integrated-circuit (IC) chips), each fabricated on a separate respective substrate, e.g., as known in the pertinent art. These IC chips are packaged together to create the optical and electrical connections shown in FIG. 1.

A first integrated circuit, labeled 110, may be an ASIC that includes the core electrical circuit 102, interface circuits $118_1$-$118_N$ and $128_1$-$128_M$, and electrical buses $112_1$-$112_N$ and $122_1$-$122_M$.

A second integrated circuit, labeled 130, may be configured to drive the optical modulators of optical transmitters $174_1$-$174_N$ in response to the data signals received via electrical buses $120_1$-$120_N$ from circuit 110. Circuit 130 may further be configured to perform signal processing to recover the data encoded in the received optical signals by demodulating the corresponding electrical signals generated by the light detectors of optical receivers $184_1$-$184_M$. For example, circuit 130 may include interface circuits $132_1$-$132_N$, serializers $136_1$-$136_N$, drive-circuit portions of optical transmitters $174_1$-$174_N$, electrical buses $134_1$-$134_N$ and $138_1$-$138_N$, amplifier portions and signal slicers of optical receivers $184_1$-$184_M$, deserializers $156_1$-$156_M$, interface circuits $152_1$-$152_M$, and electrical buses $154_1$-$154_M$ and $158_1$-$158_M$.

A third integrated circuit, labeled 170, may be an electro-optical circuit that includes the optical modulators of optical transmitters $174_1$-$174_N$, light detectors of optical receivers $184_1$-$184_M$ (also see FIG. 6), and some optical elements, such as vertical optical couplers, optical splitters, etc. Circuit 170 may also have thereon or be directly optically connected to the fiber-connecting structures $178_1$-$178_N$ and $188_1$-$188_M$ for connecting optical fibers $192_1$-$192_N$ and $194_1$-$194_M$.

In various alternative embodiments, other packaging solutions can be used to implement system 100. For example, packaging solutions that involve two, four, five, or eleven IC chips are contemplated. In general, system 100 can be implemented using any suitable, practically feasible number of IC chips.

In some embodiments, buses $138_n$ and $158_m$ may be relatively long to enable better thermal isolation between at least some parts of IC chip 170 and some heat generating digital electronics in IC chip 130.

In some embodiments, the SERDES 136/156 in system 100 can be replaced by a multi-stage SERDES similar to the SERDES disclosed in the above-cited U.S. patent application Ser. No. 16/595,698. In such embodiments, a first stage of the SERDES may be located in IC chip 110, e.g., near the core electrical circuit 102, and a second stage of the SERDES may be located in IC chip 130.

In some embodiments, system 100 may have a single-stage SERDES located in IC chip 110, e.g., near the core electrical circuit 102.

In some embodiments, placement of a single-stage SERDES or a multi-stage SERDES in system 100 may be specifically engineered to enable better heat management in system 100.

FIG. 2 shows a block diagram of optical transmitter $174_n$ according to an embodiment. Electrical bus $138_n$ and optical output port $178_n$ are also shown to better illustrate the relationship between the circuits shown in FIGS. 1 and 2. The dashed lines in FIG. 2 indicate an example partition of optical transmitter $174_n$ between integrated circuits 130 and 170 (also see FIG. 1).

In an example embodiment, optical transmitter $174_n$ comprises a constellation mapper 210, a driver circuit 220, a laser 230, and an optical modulator 240. In operation, constellation mapper 210 uses the operative constellation (e.g., a PAM-$2^r$ constellation) and a bit word supplied by electrical bus $138_n$ to determine a constellation symbol for a corresponding modulation time slot. A resulting stream 212 of such constellation symbols is applied to the driver circuit 220 that converts said stream, as known in the pertinent art, into one or more drive voltages and/or currents 222 for the optical modulator 240. In response to said one or more drive voltages and/or currents 222, the optical modulator 240 modulates an optical carrier 232 generated by the laser 230. A resulting modulated optical signal 242 is then directed to optical output port $178_n$ for further transmission.

In different embodiments, optical modulator 240 can be implemented, e.g., using one or more of the following optical modulators: (i) a Mach-Zehnder modulator; (ii) a ring modulator; and/or (iii) an electro-absorption modulator.

In the shown embodiment, laser 230 is located off-chip and is optically connected to an optical input port 288 of integrated circuit 170 using an optical fiber 286. In an alternative embodiment, laser 230 may be a part of integrated circuit 170. In such an embodiment, on-chip optical waveguides may be used instead of optical fiber 286 to optically connect laser 230 and optical modulator 240.

Figure 3:
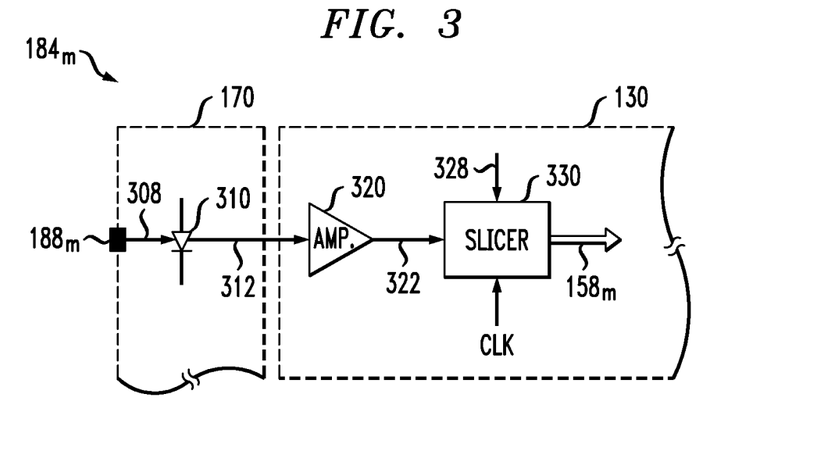
FIG. 3 shows a block diagram of an optical receiver that can be used in the optical communication system of FIG. 1 according to an embodiment.

FIG. 3 shows a block diagram of optical receiver $184_m$ according to an embodiment. Electrical bus $158_m$ and optical input port $188_m$ are also shown to better illustrate the relationship between the circuits shown in FIGS. 1 and 3. The dashed lines in FIG. 3 indicate an example partition of optical receiver $184_m$ between integrated circuits 130 and 170 (also see FIG. 1).

In an example embodiment, optical receiver $184_m$ comprises a photodetector (e.g., a photodiode) 310, an amplifier 320, and a signal slicer 330. In response to a received modulated optical signal 308, photodetector 310 generates a corresponding electrical signal 312. Amplifier 320 operates to amplify electrical signal 312, thereby generating an amplified electrical signal 322. In each modulation time slot, slicer 330 compares samples of electrical signal 322 with a set of threshold voltages and, based on the comparison, determines the corresponding bit words for the electrical bus $158_m$. The determined bit words, each of which has u bits, are outputted bitwise on the parallel lines of electrical bus $158_m$.

In an example embodiment, amplifier 320 can be a multi-stage amplifier that includes a transimpedance amplifier (TIA) and one or more variable-gain amplifiers (VGAs) as stages thereof. A closed loop can be used to implement automatic gain control for amplifier 320, e.g., as known in the pertinent art. Peaking control can be used to appropriately shape the frequency response of amplifier 320, e.g., as known in the pertinent art. Slicer 330 is clocked using a clock signal CLK. The threshold voltages used in slicer 330 are set using a control signal 328.

As used herein, the term "photonic integrated circuit" (or PIC) should be construed to cover planar lightwave circuits (PLCs), integrated optoelectronic devices, wafer-scale products on substrates, individual photonic chips and dies, and hybrid devices. Example material systems that can be used for manufacturing various PICs may include but are not limited to III-V semiconductor materials, silicon photonics, silica-on-silicon products, silica-glass-based PLCs, polymer integration platforms, Lithium Niobate and derivatives, nonlinear optical materials, etc. Both packaged devices (e.g., wired-up and/or encapsulated chips) and unpackaged devices (e.g., dies) can be referred to as PICs.

PICs can be used for various applications in telecommunications, instrumentation, and signal-processing fields. A PIC typically uses optical waveguides to implement and/or interconnect various circuit components, such as optical switches, couplers, routers, splitters, multiplexers/demultiplexers, filters, modulators, phase shifters, lasers, amplifiers, wavelength converters, optical-to-electrical (O/E) and electrical-to-optical (E/O) signal converters, etc. A waveguide in a PIC is usually an on-chip solid light conductor that guides light due to an index-of-refraction contrast between the waveguide's core and cladding. A PIC typically comprises a planar substrate on which optoelectronic devices are grown by an additive manufacturing process and/or into which optoelectronic devices are embedded by a subtractive manufacturing processes, e.g., using a multi-step sequence of photolithographic and chemical processing steps.

An "optoelectronic device" interconverts between data-carrying electrical signals and data-carrying light and may include one or more of: (i) an electrically driven light source, such as a laser diode; (ii) an optical amplifier; (iii) an optical-to-electrical converter, such as a photodiode; and (iv) an optoelectronic component that can change one or more propagation properties, e.g., amplitude and/or phase of light, such as an optical modulator or a switch. The corresponding optoelectronic circuit may additionally include one or more optical elements and/or one or more electronic components that enable the use of the circuit's optoelectronic devices in a manner consistent with the circuit's intended function. Some optoelectronic devices may be implemented using one or more PICs.

As used herein, the term "integrated circuit" (IC) should be construed to encompass both a non-packaged die and a packaged die. In a typical IC-fabrication process, dies (chips) are produced in relatively large batches using wafers of silicon or other suitable material(s). Electrical and optical circuits can be gradually created on a wafer using a multi-step sequence of photolithographic and chemical processing steps. Each wafer is then cut ("diced") into many pieces (chips, dies), each containing a respective copy of the circuit that is being fabricated. Each individual die can be appropriately packaged prior to being incorporated into a larger circuit or be left non-packaged.

The term "hybrid circuit" may refer to a multi-component circuit constructed of multiple monolithic ICs and possibly some discrete circuit components, all attached to each other to be mountable on and electrically connectable to a common base or carrier. A representative hybrid circuit may include (i) one or more packaged or non-packaged dies, with some or all of the dies including optical, optoelectronic, and/or semiconductor devices, and (ii) one or more optional discrete components, such as connectors, resistors, capacitors, and inductors. Electrical connections between the ICs, dies, and discrete components can be formed, e.g., using patterned conducting (such as metal) layers, ball-grid arrays, solder bumps, wire bonds, etc. The individual ICs may include any combination of one or more respective substrates, one or more redistribution layers (RDLs), one or more interposers, one or more laminate plates, etc.

In some embodiments, individual chips can be stacked. As used herein, the term "stack" refers to an orderly arrangement of packaged or non-packaged dies in which the facing and nearby main planes of the stacked dies are substantially parallel to each other. A stack can typically be mounted on a carrier in an orientation in which the main plains of the stacked dies are parallel to each other and/or to the main plane of the carrier.

A "main plane" of an object, such as a die, a PIC, a substrate, or an electronic IC, is a plane parallel to a substantially planar surface thereof that has the largest sizes, e.g., length and width, among all exterior surfaces of the object. This substantially planar surface may be referred to as a main surface. The feature height variation along the main surface may typically be much smaller than length or width, or both length and width, of said surface. In such cases, such main surface may be referred to as a substantially planar surface. The exterior surfaces of the object that have one relatively large size, e.g., length, and one relatively small size, e.g., height, are typically referred to as the edges of the object.

Figure 4:
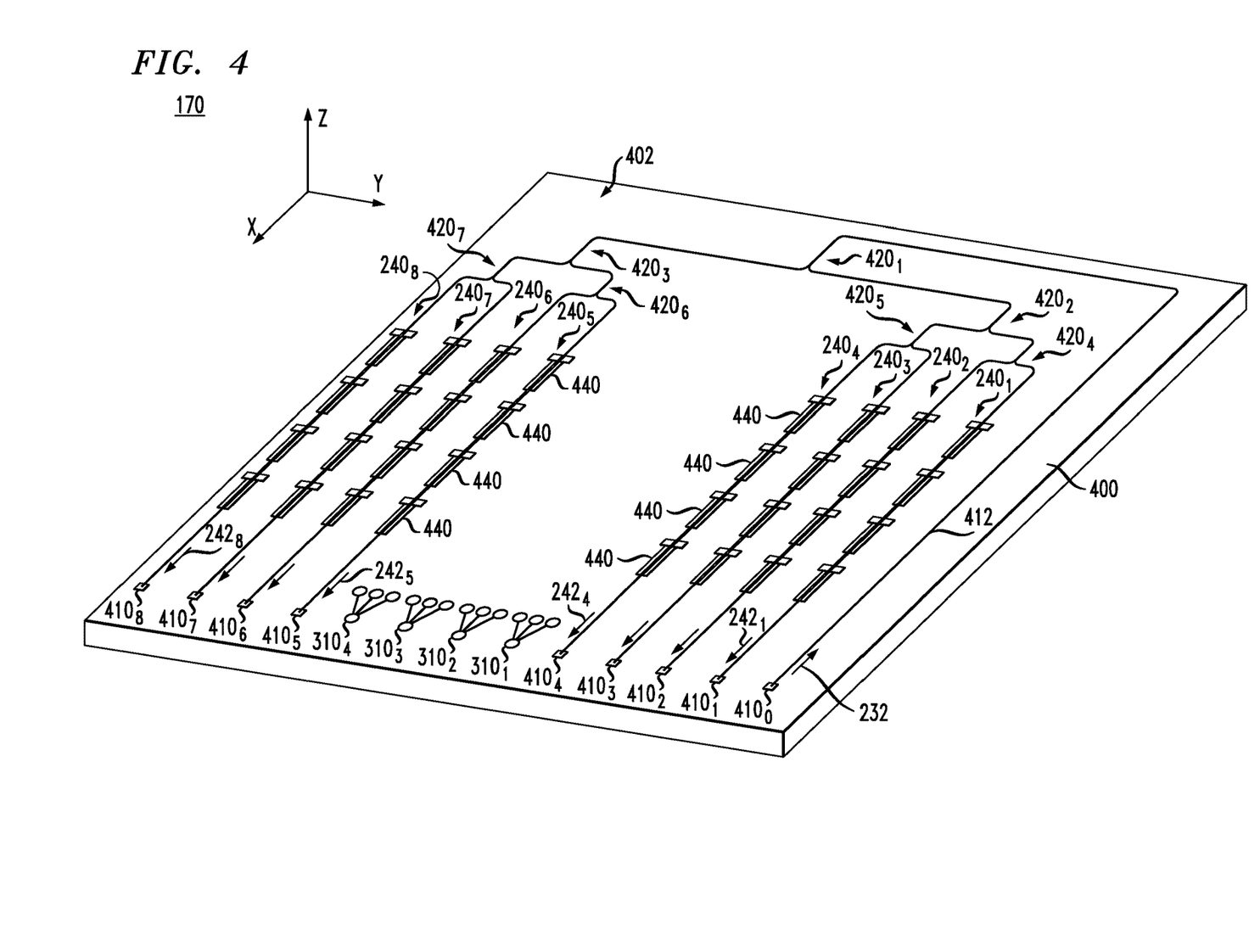
FIG. 4 shows a schematic three-dimensional perspective view of a PIC that can be used in the optical communication system of FIG. 1 according to an embodiment.

FIG. 4 shows a schematic three-dimensional perspective view of photonic integrated circuit (PIC) 170 according to an embodiment. This particular embodiment of PIC 170 corresponds to N=8, M=4 (also see FIG. 1). From the provided description, a person of ordinary skill in the art will be able to make and use other embodiments of PIC 170, e.g., corresponding to other values of and/or combinations of N and M. For example, embodiments in which N=M=64 are contemplated.

In the embodiment of FIG. 4, PIC 170 is manufactured using a substrate 400. PIC 170 has a substantially planar main surface 402 along which various circuit components are located. The circuit components include, but are not limited to vertical-coupling elements $410_0$-$410_8$, optical splitters $420_1$-$420_7$, ribbon optical modulators $240_1$-$240_8$ (also see FIG. 2), photodetectors $310_1$-$310_4$ (also see FIG. 3), and a plurality of on-chip optical waveguides connected therebetween. Optical modulators $240_1$-$240_8$ and photodetectors $310_1$-$310_4$ may be suitably electrically connected to electrical circuits comprising, e.g., driver amplifiers, transimpedance amplifiers, electronic control circuits, digital logic, microcontrollers, microprocessors, and/or electronic switches. Some of such electrical circuits may be monolithically integrated on PIC 170 with other optical and optoelectronic components thereof. Some of such electrical circuits may be on a separate chip, e.g., chip 130 (see FIGS. 1-3), and may be electrically connected to PIC 170 using suitable electrical interconnect technologies, such as bond wires, solder balls, bumps, micro-bumps, pillars, and membranes, e.g., to form a vertical stack (also see 930, FIG. 9A).

In operation, vertical-coupling elements $410_0$-$410_8$ couple light to/from the on-chip optical waveguides of PIC 170. Herein, the "vertical" direction is parallel to the Z-coordinate axis and is a direction that is substantially (e.g., to within ±5 degrees) perpendicular to main surface 402. In the context of this disclosure, the term "vertical-coupling" denotes optical coupling at an angle that is out-of-plane relative to main surface 402, but not necessarily orthogonal to said main surface. For example, vertical coupling may be implemented at angles between 0 degrees and 45 degrees as measured with respect to the Z-coordinate axis. Vertical coupling may be performed from the top side (e.g., through main surface 402) of PIC 170 or from the opposing bottom side (e.g., the substrate side) of PIC 170.

In various embodiments, vertical-coupling elements 410 may be implemented using, e.g., turning mirrors, vertical grating couplers, elephant couplers, or three-dimensional (3D) optical coupling structures that may be 3D-printed onto PIC 170. Some embodiments may benefit from the use of one or more of the vertical-coupling elements disclosed in U.S. Pat. Nos. 8,750,654, 9,927,575, and 10,025,043 and U.S. Patent Application Publication Nos. 2015/0037044, 2015/0125110, 2015/0293305, 2018/0329159, and 2019/0258175, all of which are incorporated herein by reference in their entirety.

In an example embodiment, vertical-coupling element $410_0$ is a part of optical input port 288, which is fiber-connected to external laser 230 (e.g., as indicated in FIG. 2) to receive optical carrier 232. Vertical-coupling elements $410_1$-$410_8$ are parts of optical output ports $178_1$-$178_8$, respectively (also see FIGS. 1-2).

Figure 5:
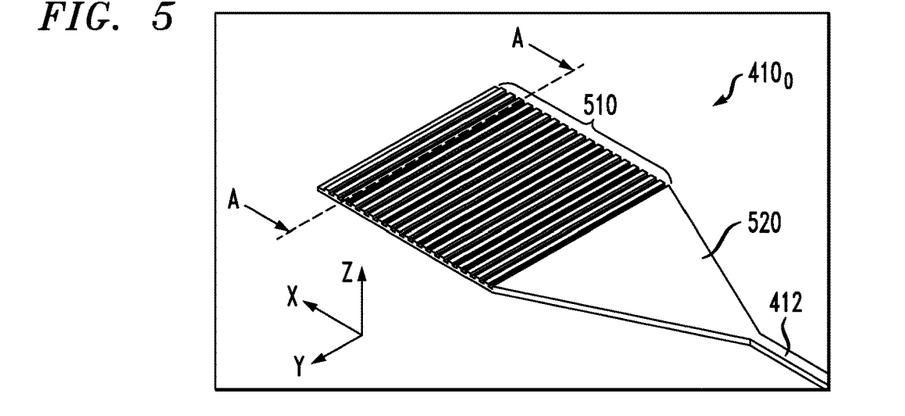
FIG. 5 shows a schematic three-dimensional perspective view of a vertical-coupling element that can be used in the PIC of FIG. 4 according to an embodiment.

FIG. 5 shows a schematic three-dimensional perspective view of vertical-coupling element $410_0$ according to an example embodiment. The XYZ-coordinate triads in FIGS. 4 and 5 indicate the relative orientation of the views shown in FIGS. 4 and 5. In some embodiments, each or some of the vertical-coupling elements $410_1$-$410_8$ may be similar to the shown vertical-coupling element $410_0$.

In the shown embodiment, vertical-coupling element $410_0$ comprises an optical grating 510 and a tapered optical waveguide 520 connected to an on-chip optical waveguide 412 (also see FIG. 4). Optical grating 510 is configured to receive light of optical carrier 232 vertically, i.e., along or at a small angle with respect to the Z-coordinate axis, and diffract the received light into tapered optical waveguide 520. Tapered optical waveguide 520 then adiabatically compresses the diffracted light into a tighter light beam, which is then coupled into optical waveguide 412, e.g., an optical waveguide with a high refractive-index contrast.

Referring back to FIG. 4, optical waveguide 412 directs the light of optical carrier 232 toward optical splitters $420_1$-$420_7$. Optical splitters $420_1$-$420_7$ are cascaded, as indicated in FIG. 4, to distribute the coupled optical-carrier light (e.g., approximately equally) between ribbon optical modulators $240_1$-$240_8$. Each of ribbon optical modulators $240_1$-$240_8$ may be independently driven (e.g., as indicated in FIG. 2) to generate a respective one of modulated optical signals $242_1$-$242_8$, which are directed to vertical-coupling elements $410_1$-$410_8$, respectively. Vertical-coupling element $410_n$ (where n=1, . . . , 8) then redirects the modulated optical signal $242_n$ approximately vertically off-chip and into optical fiber $192_n$ (also see FIG. 1).

A ribbon optical modulator $240_n$ comprises a sequence of serially connected optical modulators 440. In the shown embodiment, optical modulator $240_n$ has a series of four optical modulators 440. In alternative embodiments, optical modulator $240_n$ may have fewer or more than four optical modulators 440. For example, in some embodiments, each of ribbon optical modulators $240_1$-$240_8$ may have, e.g., a series of twenty respective optical modulators 440. In some embodiments, an optical modulator 440 can be a traveling-wave Mach-Zehnder modulator. In some other embodiments, other suitable types of optical modulators may also be used to implement optical modulators 440.

In operation, different optical modulators 440 of a particular ribbon optical modulator $240_n$ may be driven using the same data signal. The corresponding drive signals can be appropriately relatively delayed to coherently add the modulated signal portions to achieve a desired modulation depth at the output of the last optical modulator 440 of the sequence. Example drive circuits that can be used for driving optical modulators 440 in this manner are disclosed, e.g., in U.S. Patent Application Publication No. 2007/0237444, which is incorporated herein by reference in its entirety.

Optical modulators 440 and $240_n$ may be referred to as in-line optical modulators. As used herein, the term "in-line optical modulator" refers to an optical modulator constructed to modulate light as the light propagates through an on-chip optical waveguide substantially parallel to a main surface of the corresponding PIC. An in-line optical modulator should be contrasted with a vertically coupled optical modulator, which is constructed to modulate light as the light propagates through the modulator substantially orthogonally to a main surface of the corresponding PIC.

Figure 6:
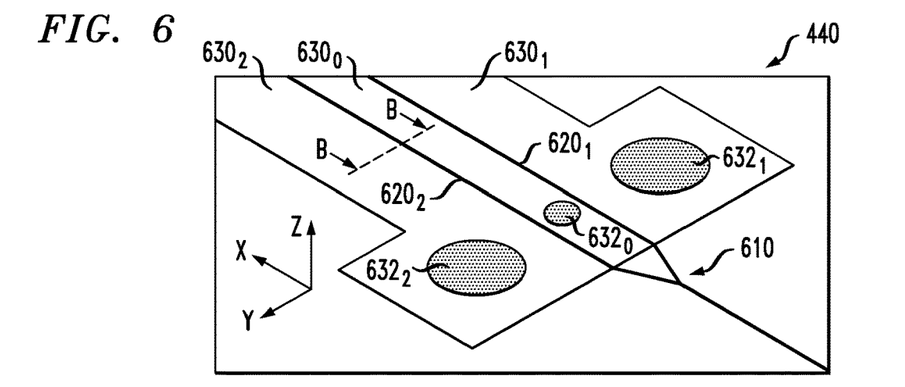
FIG. 6 shows a schematic three-dimensional perspective view of a portion of an optical modulator that can be used in the PIC of FIG. 4 according to an embodiment.

FIG. 6 shows a schematic three-dimensional perspective view of a portion of an optical modulator 440 according to an example embodiment. The XYZ-coordinate triads in FIGS. 4 and 6 indicate the relative orientation of the views shown in FIGS. 4 and 6. Due to the relatively large aspect ratio of optical modulator 440, only the input end of the modulator structure is shown in FIG. 6. For example, optical modulator 440 my have a length-to-width aspect ratio of about twenty or more.

In the shown embodiment, optical modulator 440 is a traveling-wave Mach-Zehnder modulator that comprises a 3-dB optical splitter 610 and modulator arms $620_1$ and $620_2$. At the output end of the modulator, modulator arms $620_1$ and $620_2$ are connected to an optical combiner (not explicitly shown in FIG. 6) that may be structurally similar to optical splitter 610. Optical modulator 440 further comprises traveling-wave electrodes $630_0$, $630_1$, and $630_2$ located along the modulator arms $620_1$ and $620_2$ as indicated in FIG. 6. The shown terminal portions of electrodes $630_0$, $630_1$, and $630_2$ have contact pads $632_0$, $632_1$, and $632_2$, respectively, that may be suitably electrically connected to receive the corresponding radio-frequency (RF) electrical drive signals.

Figure 7:
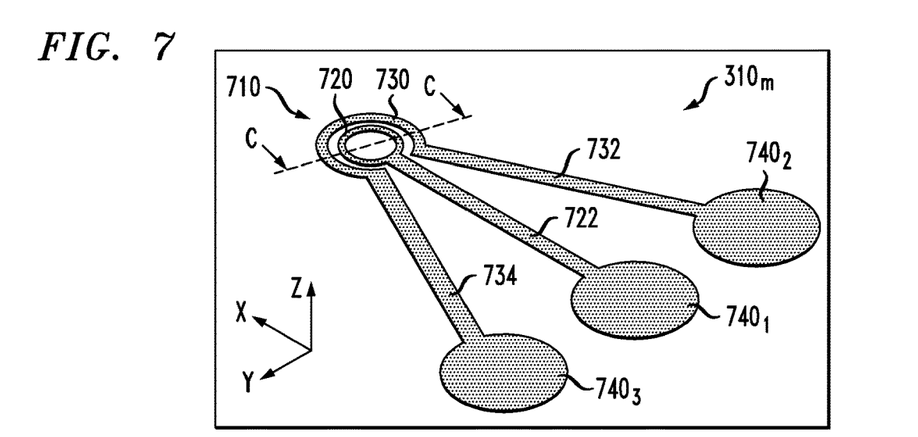
FIG. 7 shows a schematic three-dimensional perspective view of a photodetector that can be used in the PIC of FIG. 4 according to an embodiment.

FIG. 7 shows a schematic three-dimensional perspective view of a photodetector $310_m$ (where m=1, 2, 3, 4) used in PIC 170 (FIG. 4) according to an example embodiment. The XYZ-coordinate triads in FIGS. 4 and 7 indicate the relative orientation of the views shown in FIGS. 4 and 7.

In the shown embodiment, photodetector $310_m$ comprises a photodiode 710 electrically connected to quasi-circular electrodes 720 and 730. A photosensitive area of photodiode 710 is located vertically beneath the inner opening of the O-shaped electrode 720 and is configured to receive input light vertically, i.e., along or at a small angle with respect to the Z-coordinate axis. In an example embodiment, electrode 720 may be electrically connected to the n portion of photodiode 710, and electrode 730 may be electrically connected to the p portion of photodiode 710. Electrical leads 722, 732, and 734 electrically connect electrodes 720 and 730 to contact pads $740_1$, $740_2$, and $740_3$, respectively, which may be used to appropriately electrically bias photodiode 710 and measure the photocurrent generated therein in response to the vertically received input light.

Referring back to FIG. 4, in an example embodiment, the photodiodes 710 of photodetectors $310_1$-$310_4$ and the optical gratings 510 of vertical-coupling elements $410_0$-$410_8$ are arranged along main surface 402 to form a linear array.

Figure 8:
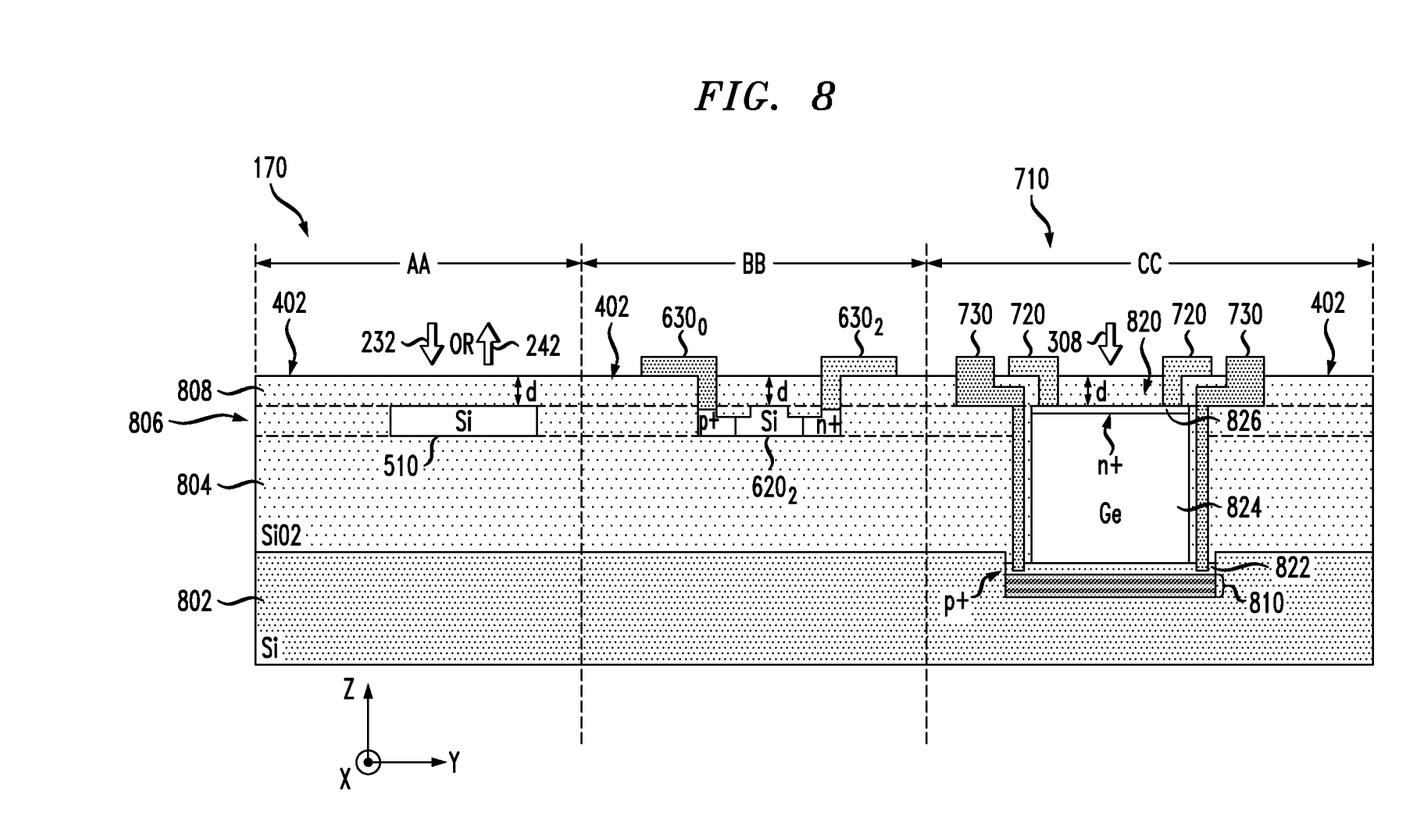
FIG. 8 shows schematic cross-sectional views of the PIC of FIG. 4 according to an embodiment.

FIG. 8 shows schematic cross-sectional views of PIC 170 (FIG. 4) according to an embodiment. For illustration purposes, FIG. 8 fuses cutout cross-sectional views AA, BB, and CC, without showing any intermediate portions of PIC 170. The cross-sectional planes corresponding to the shown cross-sectional views AA, BB, and CC are also indicated in FIGS. 5, 6, and 7, respectively. The XYZ-coordinate triads in FIGS. 5-8 further indicate the relative orientations of the views shown in these figures.

The embodiment illustrated in FIG. 8 can be implemented using the silicon photonics (SiP) material platform. As known in the pertinent art, silicon photonics uses silicon (primarily but not exclusively) as an optical medium. The silicon may be patterned with sub-micron precision to create SiP circuit elements and components suitable for infrared light, e.g., light with wavelengths near 1310 nm and/or 1550 nm. The patterned-silicon layer (also sometimes referred to as the device layer) typically lies on top of a silicon oxide layer. By analogy with a similar wafer construction used in microelectronics, the substrate structure of SiP chips may be referred to as silicon on insulator (SOI). SiP chips can typically be manufactured using existing semiconductor fabrication techniques. Furthermore, because the silicon material platform is widely used for electronic integrated circuits, hybrid devices in which optical and electronic circuits are integrated onto a single chip can be manufactured in a relatively straightforward manner Many of existing SiP applications are in the sub-field of optical data communications where the optical-signal reach of under several kilometers is expected.

In the embodiment shown in FIG. 8, PIC 170 has been manufactured using a SOI substrate comprising a silicon base layer 802, a silicon-oxide insulator layer 804, and a silicon device layer 806. An additional silicon oxide layer 808 is used in PIC 170 to cover and/or encapsulate the patterned device layer 806 and some other structures formed within the SOI-substrate layers 802-806, e.g., as further explained below.

In an example embodiment, silicon device layer 806 is patterned and etched in a conventional manner to create optical gratings 510 for vertical-coupling elements $410_0$-$410_8$ and also at least some of the on-chip optical waveguides (e.g., 412, 520, and 620) of PIC 170. As a result, the top surfaces of these elements of PIC 170 are located at approximately the same vertical distance d from main surface 402 (see, e.g., elements 510 and $620_2$ in FIG. 8).

In the example embodiment shown in FIG. 8, optical waveguide $620_2$ is a ridge waveguide, the ridged core of which has one portion made of n-doped silicon and another portion made of p-doped silicon, the two portions forming a p-n junction along the length of the core. The silicon oxide layers 804 and 808 around the ridged core serve as the cladding of optical waveguide $620_2$. Ohmic contacts between the p-n junction and electrodes $630_0$ and $630_2$ can be implemented as known in the art, e.g., by varying the dopant concentration in the silicon portions located between the ridge and the electrodes. For example, n+- and/or n++-doped silicon may be used to provide an ohmic contact between the n-doped portion of the ridge and electrode $630_2$. Similarly, p+- and/or p++-doped silicon may be used to provide an ohmic contact between the p-doped portion of the ridge and electrode $630_0$. Intermediately doped portions may be optional and may not be present in some embodiments.

In operation, the p-n junction of optical waveguide $620_2$ functions as a phase shifter. For example, when a reverse bias is applied to the p-n junction, a depletion region forms within the waveguide. During the positive swing of the drive voltage applied between electrodes $630_0$ and $630_2$, the size of this depletion region increases, thereby decreasing the effective refractive index of the waveguide. During the negative swing of the drive voltage, the size of this depletion region decreases, thereby increasing the effective refractive index of the waveguide. This modulation of the effective refractive index causes the corresponding modulation of the phase of the light transmitted through waveguide 620.

In the example embodiment shown in FIG. 8, photodiode 710 uses germanium (Ge) as the photoactive material because the band gap of germanium (0.67 eV) is smaller than the photon energy at 1550 nm (i.e., the approximate intended wavelength of modulated optical signal 308; also see FIG. 3). A person of ordinary skill in the art will understand that the choices of semiconductor materials for photodiode 710 may depend on the intended operating wavelength. For example, different telecommunications applications may use the spectral bands located near 850 nm, 1300 nm, and 1550 nm, respectively.

Photodiode 710 comprises semiconductor layers 822, 824, and 826 arranged in a vertical stack. Layer 822 is a relatively thin layer comprising p+-doped silicon. Layer 824 is a relatively thick layer comprising intrinsic germanium. Layer 826 is a relatively thin layer comprising n+-doped germanium. Layers 822, 824, and 826 thus form a p-Si/i-Ge/n-Ge heterojunction that can be electrically biased and operated using electrodes 720 and 730. More specifically, layer 822 is electrically connected to electrode 730, and layer 826 is electrically connected to electrode 720 as indicated in FIG. 8. Upon absorption of light of optical signal 308 in layer 824, electron-hole pairs are created and then spatially separated by the external electric field produced by the reverse bias applied to the photodiode, leading to generation of photocurrent.

As used herein, the term "reverse bias" refers to an electrical configuration of a semiconductor-junction diode in which the n-type material is at a high electrical potential, and the p-type material is at a low electrical potential. The reverse bias creates a relatively large electric field across the p-i-n junction that can efficiently separate the holes and electrons generated therein by the absorbed light. The separated electrical carriers generate a photocurrent that can be collected and measured as known in the art to determine the light intensity.

In an example embodiment, the layer stack 822/824/826 of photodiode 710 may be buried in a deep via 820 formed (e.g., etched) in SOI substrate layers 804 and 806. In some embodiments, the via 820 may also partially enter into the silicon base layer 802, e.g., as shown in FIG. 8. During fabrication, germanium may be deposited into the via 820 and then polished to be flush with the top surface of device layer 806. Silicon oxide layer 808 is then deposited over device layer 806 to cover the Ge-filled via 820, form the upper cladding of waveguides 620, 520, and 412, and encapsulate gratings 510. Silicon oxide layer 808 may be processed in a conventional manner to form proper metal interconnects therein and electrodes 630, 720, and 730 at the top surface thereof. As a result of this fabrication sequence, the top surface of photodiode 710 and the top surfaces of the cores of waveguides 620 and of grating 510 are located at approximately the same vertical distance d from the main surface 402 of PIC 170, as indicated in FIG. 8.

In some embodiments, the top surface of the layer stack 822/824/826 of photodiode 710 may be located at vertical distance $d_1$ from the main surface 402 of PIC 170, while the top surfaces of the cores of waveguides 620 and of grating 510 are located at vertical distance $d_2$ from the main surface 402 of PIC 170, where $d_1 \neq d_2$. For example, the absolute value of the difference between the distances $d_1$ and $d_2$ may be smaller than approximately 100 nm, e.g., $|d_1-d_2| \leq 100$ nm.

In some embodiments, the via 820 may optionally contain, in the bottom portion thereof, a distributed Bragg reflector (DBR) mirror 810, with the layer stack 822/824/826 being vertically above the DBR mirror in the via. As known in the pertinent art, a DBR mirror can be formed, e.g., using a stack of semiconductor and/or dielectric layers, each having a quarter-wavelength thickness, with adjacent layers of the stack having alternating refractive indices. For example, DBR mirror 810 may be formed using a suitable number of silicon and silicon oxide layers. In operation, DBR mirror 810 may reflect a portion of the modulated optical signal 308 that has not been absorbed on the first pass through the layer stack 822/824/826. At least some of the reflected light can thus be absorbed in the layer stack 822/824/826 on the second pass therethrough, which can beneficially increase the effective light sensitivity of photodiode 710.

Figure 9A:
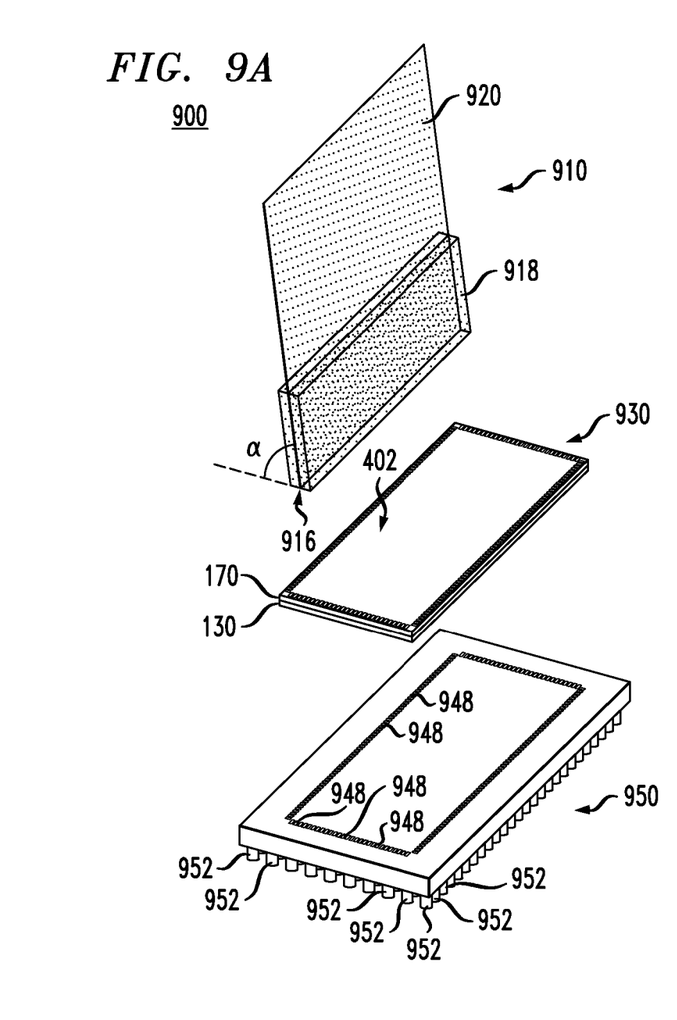
FIGS. 9A-9B show schematic three-dimensional perspective views of a packaged chipset that can be used in the optical communication system of FIG. 1 according to an embodiment.
Figure 9B:
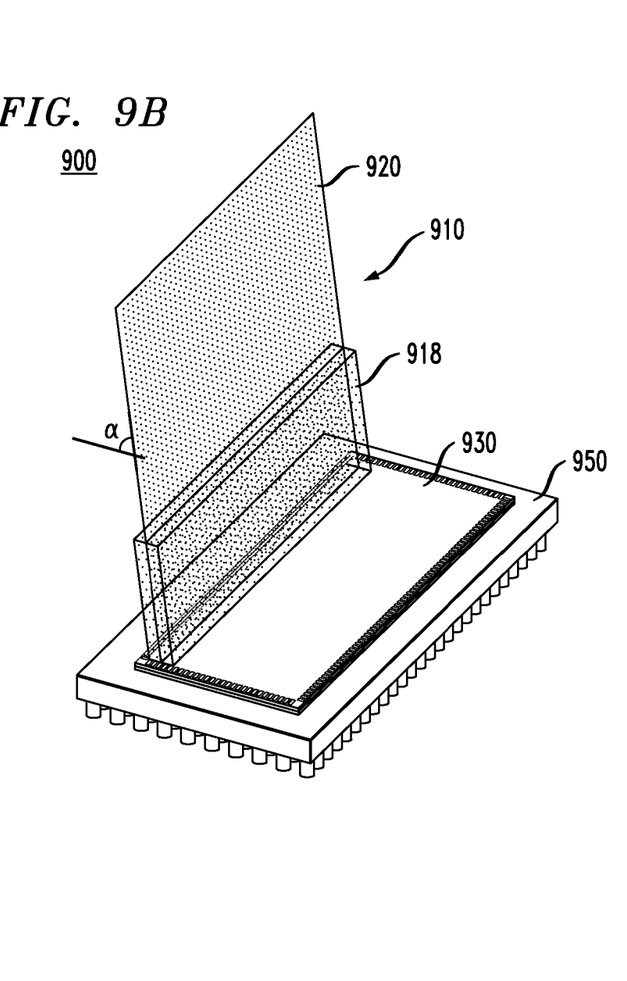

FIGS. 9A-9B show schematic three-dimensional perspective views of a packaged chipset 900 that can be used in system 100 (FIG. 1) according to an embodiment. More specifically, FIG. 9A shows a three-dimensional exploded diagram of packaged chipset 900. FIG. 9B shows a three-dimensional perspective view of packaged chipset 900 in the assembled form.

In an example embodiment, chipset 900 comprises a fiber assembly block (FAB) 910, a vertical chip stack 930, and an array of male or female socket connectors 950.

FAB 910 includes end segments of a plurality of optical fibers 920, different ones of which may implement individual ones of optical fibers 192, 194, or 286. End segments of optical fibers 920 are sandwiched between two glass plates (not explicitly shown in FIGS. 9A-9B; see FIG. 10) of a fiber holder 918. A planar end surface 916 of fiber holder 918 may not be orthogonal to the end segments of optical fibers 920. As a result, when end surface 916 is attached (e.g., glued) to main surface 402 of PIC 170, the end segments of optical fibers 920 may be oriented at a non-zero angle of (90−α) degrees with respect to the normal to main surface 402. The angle α is indicated in both FIGS. 9A and 9B. In an example embodiment, the angle α can be about 80 degrees. In some embodiments, the angle α can be 90 degrees. Fiber holder 918 is further described below in reference to FIG. 10.

Chip stack 930 comprises PIC 170 and integrated circuit 130, which are attached to one another such that main surface 402 of the PIC is at the top surface of the chip stack. FAB 910 can be attached to surface 402 of chip stack 930, e.g., as indicated above.

In some embodiments, chip stack 930 can be replaced by a single chip designed and configured to implement the functions of both PIC 170 and integrated circuit 130.

In the shown example embodiment, socket connector 950 comprises a plurality of electrical pins 952 at the bottom surface thereof. Socket connector 950 further comprises a plurality of contact pads 948 at the top surface thereof. The body of socket connector 950 includes a metal interconnect (not explicitly shown in FIG. 9) that appropriately electrically connects contact pads 948 and electrical pins 952. Chip stack 930 is mounted on (e.g., soldered to) the top surface of socket connector 950 such that circuit 130 of the chip stack is appropriately electrically connected to the contact pads 948. Electrical pins 952 of socket connector 950 can then be mated with the corresponding receptacles on a matching female socket connector (not explicitly shown in FIGS. 9A-9B), e.g., to provide high-speed electrical connections to circuit 110 (also see FIG. 1).

Figure 10:
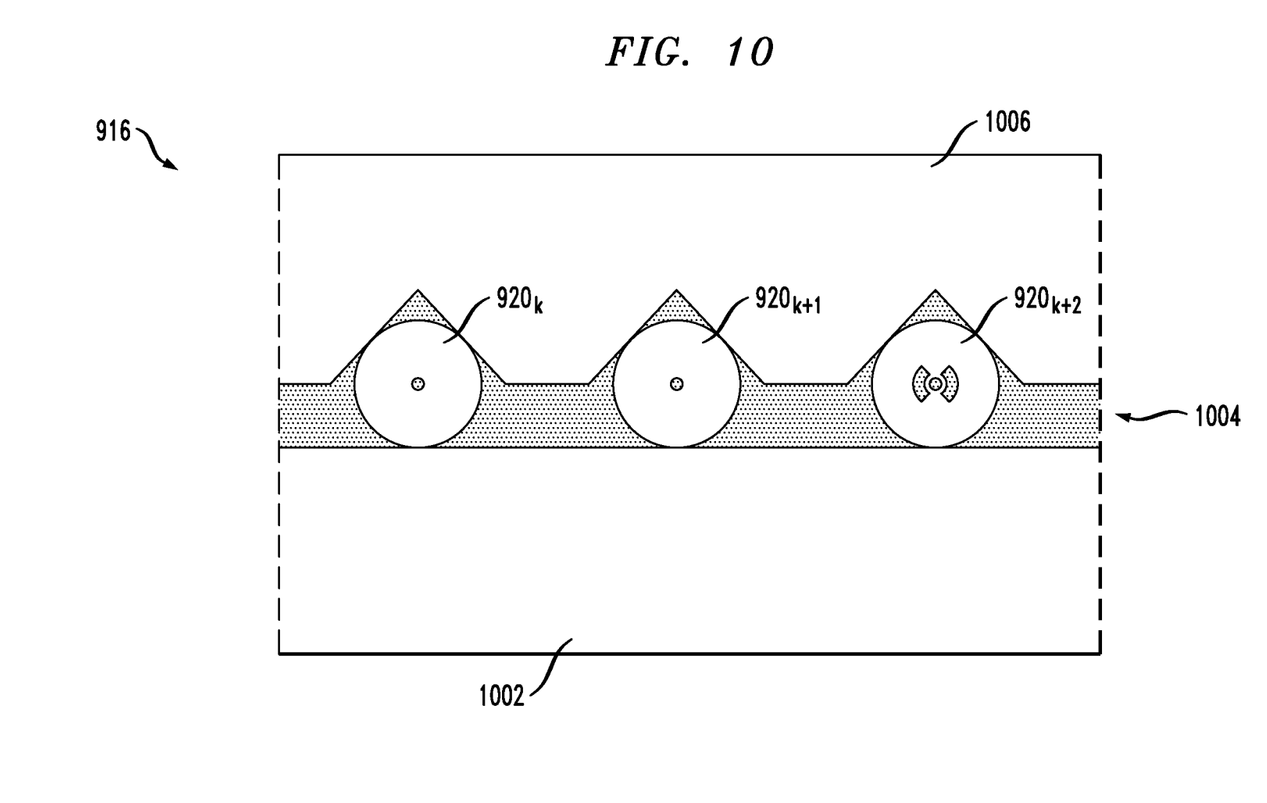
FIG. 10 schematically shows an end view of a portion of a fiber assembly block that can be used in the packaged chipset of FIGS. 9A-9B according to an embodiment.

FIG. 10 schematically shows a portion of the planar end surface 916 of FAB 910 (FIG. 9) according to an embodiment. For illustration purposes, the shown portion has ends of only three optical fibers 920, which are labeled $920_k$, $920_{k+1}$, and $920_{k+2}$, respectively. However, the full length of end surface 916 typically has additional optical fibers 920 held in a similar manner. For example, in some embodiments, the total number of fibers 920 in FAB 910 can be more than one hundred.

In the embodiment shown in FIG. 10, fiber holder 918 comprises glass plates 1002 and 1006. Glass plate 1006 has V-shaped grooves into which the end segments of optical fibers 920 are inserted. Glass plate 1002 is then glued to glass plate 1006 to fix the end segments of optical fibers 920 in the V-shaped grooves, e.g., using an epoxy resin 1004.

The distances between the V-shaped grooves of glass plate 1006 are selected such that the different optical fibers 920 of FAB 910 can be appropriately optically aligned with the corresponding circuit elements of PIC 170 when end surface 916 is glued to main surface 402 of PIC 170. For example, some of the optical fibers 920 can be optically aligned with gratings 510 of different respective vertical-coupling elements 410. Some other optical fibers 920 can be optically aligned with photodiodes 710 of different respective photodetectors 310. In general, the V-shaped grooves of glass plate 1006 are arranged such as to match the arrangement of the vertical-coupling elements 410 and photodetectors 310 on the main surface 402 of PIC 170 (also see FIG. 4). In some embodiments, the V-shaped grooves of glass plate 1006 may be arranged such that the ends of optical fibers 920 are equidistant within end surface 916.

In some embodiments, each optical fiber 920 may end-connect to the near end of a corresponding co-linear optical mode converter, and opposite ends of said optical mode converters may be equidistant with the end surface 916 to provide an array of low-loss optical couplers to vertical-coupling elements 410 and photodetectors 310 on the main surface 402 of PIC 170.

In an example embodiment, the above-mentioned different distances $d_1$ and $d_2$ or the same distance d (FIG. 8) may be selected such that the optical coupling losses between the ends of optical fibers 920 and the corresponding photodiodes 710 and vertical-coupling elements 410 are relatively low. It may also be beneficial to have similar optical coupling losses for different ones of photodiodes 710 and vertical-coupling elements 410, e.g., optical coupling losses that are not too disparate across end surface 916 for light corresponding to different optical fibers 920.

In various embodiments, different optical fibers 920 may be of the same type or of different types. As an example, FIG. 10 illustrates an embodiment in which (i) each of optical fibers $920_k$ and $920_{k+1}$ is a single-mode fiber (e.g., with a 9-μm circular core) and (ii) optical fiber $920_{k+2}$ is a single-mode, polarization-maintaining fiber having bow-tie-shaped stress applied parts. A person of ordinary skill in the art will understand that other types of optical fiber may also be used in FAB 910.

According to an example embodiment disclosed above, e.g., in the summary section and/or in reference to any one or any combination of some or all of FIGS. 1-10, provided is an apparatus comprising: a substrate (e.g., 400, FIG. 4) having a substantially planar main surface (e.g., 402, FIG. 4); a plurality of photodiodes (e.g., $310_1$-$310_4$, FIG. 4) integrated in the substrate to enable vertical coupling of input light (e.g., 308, FIGS. 3, 8) thereto through said main surface; and a plurality of in-line optical modulators (e.g., $240_1$-$240_8$, FIG. 4) integrated in the substrate and waveguide-connected in the substrate to a plurality of first vertical-coupling elements (e.g., $410_1$-$410_8$, FIG. 4) to enable vertical coupling of output light (e.g., 242, FIGS. 2, 8) therefrom through said main surface.

In some embodiments of the above apparatus, the apparatus further comprises a fiber assembly block (e.g., 910, FIG. 9) having a substantially planar end surface (e.g., 916, FIGS. 9A, 10) fixedly attached to said main surface, the fiber assembly block including a plurality of optical fibers (e.g., 920, FIG. 9), a first subset of the optical fibers (e.g., 194, FIG. 1) being configured to transmit the input light through said end surface to the photodiodes, a second subset of the optical fibers (e.g., 192, FIG. 1) being configured to receive the output light through said end surface from the first vertical-coupling elements.

In some embodiments of any of the above apparatus, end segments of the optical fibers in the fiber assembly block are oriented with respect to said end surface at an angle (e.g., α, FIG. 9) that is different from 90 degrees.

In some embodiments of any of the above apparatus, the fiber assembly block has end segments of at least 50 optical fibers.

In some embodiments of any of the above apparatus, the plurality of in-line optical modulators is further waveguide-connected in the substrate to at least one second vertical-coupling element (e.g., $410_0$, FIG. 4) to input light (e.g., 232, FIGS. 2, 8) thereto.

In some embodiments of any of the above apparatus, the apparatus further comprises one or more optical splitters (e.g., $420_1$-$420_7$, FIG. 4) between the at least one second vertical-coupling element and the in-line optical modulators.

In some embodiments of any of the above apparatus, the apparatus further comprises a fiber assembly block (e.g., 910, FIG. 9) having a substantially planar end surface (e.g., 916, FIGS. 9A, 10) and a plurality of optical fibers (e.g., 920, FIG. 9), a first subset of the optical fibers (e.g., 194, FIG. 1) being configured to transmit the input light to the photodiodes, a second subset of the optical fibers (e.g., 192, FIG. 1) being configured to receive the output light from the first vertical-coupling elements, a third subset of one or more of the optical fibers (e.g., 286, FIG. 2) being configured to transmit carrier light to the at least one second vertical-coupling element.

In some embodiments of any of the above apparatus, the fiber assembly block has end segments of at least 100 optical fibers.

In some embodiments of any of the above apparatus, the photodiodes and the first vertical-coupling elements are arranged in a linear array along said main surface.

In some embodiments of any of the above apparatus, top semiconductor surfaces of the photodiodes and top semiconductor surfaces of the first vertical-coupling elements are located at approximately same vertical distance (e.g., d, FIG. 8) from said main surface.

In some embodiments of any of the above apparatus, top semiconductor surfaces of the photodiodes and top semiconductor surfaces of waveguide cores of the in-line optical modulators are located at approximately same vertical distance (e.g., d, FIG. 8) from said main surface.

In some embodiments of any of the above apparatus, at least one of the in-line optical modulators comprises a Mach-Zehnder modulator (e.g., 440, FIGS. 4, 6).

In some embodiments of any of the above apparatus, each of the in-line optical modulators comprises a sequence of end-connected Mach-Zehnder modulators (e.g., 440, FIG. 4).

In some embodiments of any of the above apparatus, the apparatus further comprises a plurality of optical data receivers (e.g., $184_1$-$184_M$, FIG. 1) and a plurality of optical data modulators (e.g., $174_1$-$174_N$, FIG. 1); and wherein each of the optical data receivers comprises a respective one of the photodiodes.

In some embodiments of any of the above apparatus, the photodiodes are buried in respective vias (e.g., 820, FIG. 8) formed in the substrate.

In some embodiments of any of the above apparatus, the substrate comprises a base layer (e.g., 802, FIG. 8), an insulator layer (e.g., 804, FIG. 8), and a device layer (e.g., 806, FIG. 8) arranged in a vertical stack; and wherein the vias penetrate the device layer and enter the insulator layer.

In some embodiments of any of the above apparatus, at least some of the vias penetrate the insulator layer and enter the base layer (e.g., as shown in FIG. 8).

In some embodiments of any of the above apparatus, the base layer comprises silicon; the insulator layer comprises silicon oxide; the device layer comprises silicon; and the photodiodes comprise germanium.

In some embodiments of any of the above apparatus, at least some of the vias have Bragg reflectors (e.g., 810, FIG. 8) therein.

In some embodiments of any of the above apparatus, the plurality of in-line optical modulators is further waveguide-connected in the substrate to at least one second vertical-coupling element (e.g., $410_0$, FIG. 4) to enable vertical coupling of carrier light (e.g., 232, FIGS. 2, 8) thereto through said main surface.

In some embodiments of any of the above apparatus, the in-line optical modulators are configured to modulate the carrier light to generate the output light.

In some embodiments of any of the above apparatus, the apparatus further comprises one or more optical splitters (e.g., $420_1$-$420_7$, FIG. 4) integrated in the substrate and waveguide-connected between the at least one second vertical-coupling element and the in-line optical modulators.

In some embodiments of any of the above apparatus, the apparatus further comprises a fiber assembly block (e.g., 910, FIG. 9) having a substantially planar end surface (e.g., 916, FIGS. 9A, 10) fixedly attached to said main surface, the fiber assembly block including a plurality of optical fibers (e.g., 920, FIG. 9), a first subset of the optical fibers (e.g., 194, FIG. 1) being configured to transmit the input light through said end and main surfaces to the photodiodes, a second subset of the optical fibers (e.g., 192, FIG. 1) being configured to receive the output light through said end and main surfaces from the first vertical-coupling elements, a third subset of the optical fibers (e.g., 286, FIG. 2) being configured to transmit the carrier light through said end and main surfaces to the at least one second vertical-coupling element.

In some embodiments of any of the above apparatus, each of the first vertical-coupling elements comprises a respective optical grating (e.g., 510, FIGS. 5, 8) waveguide-connected to a respective one of the in-line optical modulators; and wherein top surfaces of the photodiodes and of the optical gratings are located at approximately same vertical distance (e.g., d, FIG. 8) from said main surface.

While this disclosure includes references to illustrative embodiments, this specification is not intended to be construed in a limiting sense. Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain the nature of this disclosure may be made by those skilled in the art without departing from the scope of the disclosure, e.g., as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

Throughout the detailed description, the drawings, which are not to scale, are illustrative only and are used in order to explain, rather than limit the disclosure. The use of terms such as height, length, width, top, bottom, is strictly to facilitate the description of the embodiments and is not intended to limit the embodiments to a specific orientation. For example, height does not imply only a vertical rise limitation, but is used to identify one of the three dimensions of a three dimensional structure as shown in the figures. Such "height" would be vertical where the electrodes are horizontal but would be horizontal where the electrodes are vertical, and so on. Similarly, while some of the figures show the different layers as horizontal layers such orientation is for descriptive purpose only and not to be construed as a limitation.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. The same type of distinction applies to the use of terms "attached" and "directly attached," as applied to a description of a physical structure. For example, a relatively thin layer of adhesive or other suitable binder can be used to implement such "direct attachment" of the two corresponding components in such physical structure.

The description and drawings merely illustrate the principles of the disclosure. It will thus be appreciated that those of ordinary skill in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

What is claimed is:

1. An apparatus comprising:
   a substrate having a substantially planar main surface;
   a plurality of photodiodes integrated in the substrate to enable vertical coupling of input light into the photodiodes such that one of the photodiodes receives part of the input light through an area of said main surface vertically above said one of the photodiodes; and
   a plurality of in-line optical modulators integrated in the substrate and waveguide-connected in the substrate to a plurality of first vertical-coupling elements to enable vertical coupling of output light therefrom through said main surface.

2. The apparatus of claim 1, further comprising a fiber assembly block having a substantially planar end surface fixedly attached to said main surface, the fiber assembly block including a plurality of optical fibers, a first subset of the optical fibers being configured to transmit the input light through said end surface to the photodiodes, a second subset of the optical fibers being configured to receive the output light through said end surface from the first vertical-coupling elements.

3. The apparatus of claim 2, wherein end segments of the optical fibers in the fiber assembly block are oriented with respect to said end surface at an angle that is different from 90 degrees.

4. The apparatus of claim 2, wherein the fiber assembly block has end segments of at least 50 optical fibers.

5. The apparatus of claim 1, wherein the plurality of in-line optical modulators is further waveguide-connected in the substrate to at least one second vertical-coupling element to input light thereto.

6. The apparatus of claim 5, further comprising one or more optical splitters between the at least one second vertical-coupling element and the in-line optical modulators.

7. The apparatus of claim 5, further comprising a fiber assembly block having a substantially planar end surface and a plurality of optical fibers, a first subset of the optical fibers being configured to transmit the input light to the photodiodes, a second subset of the optical fibers being configured to receive the output light from the first vertical-coupling elements, a third subset of one or more of the optical fibers being configured to transmit carrier light to the at least one second vertical-coupling element.

8. The apparatus of claim 7, wherein the fiber assembly block has end segments of at least 100 optical fibers.

9. The apparatus of claim 1, wherein the photodiodes and the first vertical-coupling elements are arranged in a linear array along said main surface.

10. The apparatus of claim 1, wherein top semiconductor surfaces of the photodiodes and top semiconductor surfaces of the first vertical-coupling elements are located at approximately same vertical distance from said main surface.

11. The apparatus of claim 1, wherein top semiconductor surfaces of the photodiodes and top semiconductor surfaces of waveguide cores of the in-line optical modulators are located at approximately same vertical distance from said main surface.

12. The apparatus of claim 1, wherein at least one of the in-line optical modulators comprises a Mach-Zehnder modulator.

13. The apparatus of claim 1, wherein each of the in-line optical modulators comprises a sequence of end-connected Mach-Zehnder modulators.

14. The apparatus of claim 1, further comprising a plurality of optical data receivers and a plurality of optical data modulators; and wherein each of the optical data receivers comprises a respective one of the photodiodes.

15. The apparatus of claim 1, wherein the photodiodes are buried in respective vias formed in the substrate.

16. The apparatus of claim 15, wherein the substrate comprises a base layer, an insulator layer, and a device layer arranged in a vertical stack; and wherein the vias penetrate the device layer and enter the insulator layer.

17. The apparatus of claim 16, wherein:

the base layer comprises silicon;

the insulator layer comprises silicon oxide;

the device layer comprises silicon; and the photodiodes comprise germanium.

18. The apparatus of claim 15, wherein at least some of the vias have Bragg reflectors therein.

\* \* \* \* \*